(12) United States Patent
Paraskevas et al.

(10) Patent No.: US 10,977,885 B1
(45) Date of Patent: Apr. 13, 2021

(54) METHOD FOR DIGITAL KEY MISBEHAVIOR AND SYBIL ATTACK DETECTION THROUGH USER PROFILING

(71) Applicant: GM GLOBAL TECHNOLOGY OPERATIONS LLC, Detroit, MI (US)

(72) Inventors: Evripidis Paraskevas, Royal Oak, MI (US); Jinzhu Chen, Troy, MI (US); Fan Bai, Ann Arbor, MI (US); John Sergakis, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/592,145

(22) Filed: Oct. 3, 2019

(51) Int. Cl.
| | |
|---|---|
| *G07C 9/00* | (2020.01) |
| *H04W 4/80* | (2018.01) |
| *B60R 25/24* | (2013.01) |
| *H04W 12/06* | (2021.01) |
| *H04W 12/08* | (2021.01) |

(52) U.S. Cl.
CPC .......... *G07C 9/00309* (2013.01); *B60R 25/24* (2013.01); *G07C 9/00571* (2013.01); *H04W 4/80* (2018.02); *H04W 12/06* (2013.01); *H04W 12/08* (2013.01)

(58) Field of Classification Search
CPC ....................................................... G07C 9/00
See application file for complete search history.

(56) References Cited

U.S. PATENT DOCUMENTS

| | | | |
|---|---|---|---|
| 10,375,100 B2 * | 8/2019 | Grayson ............... | H04W 24/00 |
| 10,490,000 B2 * | 11/2019 | Schoenfelder ......... | G07C 9/257 |
| 10,642,995 B2 * | 5/2020 | Shih ........................ | G06F 21/84 |
| 10,642,998 B2 * | 5/2020 | Ford ..................... | G06F 21/577 |
| 10,747,767 B2 * | 8/2020 | Johnson ................ | G06F 16/278 |

* cited by examiner

*Primary Examiner* — K. Wong
(74) *Attorney, Agent, or Firm* — Quinn IP Law

(57) ABSTRACT

A digital key sharing system includes an electronic circuit and a first server computer. The electronic circuit is configured to store a plurality of digital keys, receive a plurality of key sharing requests, and generate a plurality of features in response to the plurality of key sharing requests. The first server computer is in wireless communication with the electronic circuit and is configured to generate an alert signal in response to finding one or more anomalies in the plurality of features to initiate a notification to a primary user device associated with the electronic circuit, and send a suspend notification signal to the electronic circuit in response to the finding of the one or more anomalies in the plurality of features. The electronic circuit is further configured to suspend use of the plurality of digital keys in response to reception of the suspend notification signal.

20 Claims, 5 Drawing Sheets

METHOD FOR DIGITAL KEY MISBEHAVIOR AND SYBIL ATTACK DETECTION THROUGH USER PROFILING

INTRODUCTION

Use of digital keys in place of physical keys is becoming more popular in the automotive world. Many automotive manufacturers are working on proprietary solutions that allow owners to gain access to their vehicles using smart devices in close proximity to the vehicles. The access can include locking/unlocking of doors and starting/stopping an engine. Having the digital keys reside on the smart devices also enables a degree of key sharing among additional smart devices. However, if one of the smart devices is compromised, the digital keys stored therein can be used to exploit the vehicle. During the exploitation, security of the vehicle is subverted when many forged copies of the compromised digital key attempt to gain access to the vehicle over a short period of time.

What is needed is a technique to detect out-of-order keys and/or suspicious key sharing request behavior.

SUMMARY

A digital key sharing system is provided herein. The digital key sharing system comprises an electronic circuit and a first server computer. The electronic circuit is configured to store a plurality of digital keys, receive a plurality of key sharing requests, and generate a plurality of features in response to the plurality of key sharing requests. The first server computer is in wireless communication with the electronic circuit. The first server computer is configured to generate an alert signal in response to finding one or more anomalies in the plurality of features to initiate a notification to a primary user device associated with the electronic circuit, and send a suspend notification signal to the electronic circuit in response to the finding of the one or more anomalies in the plurality of features.

In one or more embodiments of the digital key sharing system, the electronic circuit receives the plurality of key sharing requests from a plurality of secondary user devices. At least one of the plurality of secondary user devices comprises a smart device that is portable.

In one or more embodiments of the digital key sharing system, the electronic circuit is further configured to generate the plurality of features by analyzing a plurality of physical distances between the electronic circuit and the plurality of secondary user devices, and analyze a plurality of arrival times of the plurality of key sharing requests.

In one or more embodiments of the digital key sharing system, the first server computer is further configured to determine a plurality of clusters of the plurality of features, and track the plurality of clusters in a multidimensional space to find the one or more anomalies.

In one or more embodiments of the digital key sharing system, the first server computer is further configured to generate individual validation decisions for individual clusters of the plurality of clusters based on the tracking, the individual validation decisions indicate that the individual clusters of the plurality of clusters are either a normal behavior or a misbehavior, and the generation of the alert signal is in response to at least one of the individual validation decisions indicating the misbehavior.

In one or more embodiments of the digital key sharing system, the misbehavior comprises a Sybil attack during which the electronic circuit receives a plurality of improper digital key sharing requests.

In one or more embodiments of the digital key sharing system, the first server computer is further configured to estimate a plurality of classifications of the plurality of clusters in a multidimensional space to find the one or more anomalies.

In one or more embodiments of the digital key sharing system, the first server computer is further configured to compare the plurality of classifications with a plurality of use case classes, and the generation of the alert signal is in response to at least one mismatch between the plurality of classifications and the plurality of use case classes.

In one or more embodiments of the digital key sharing system, the electronic circuit forms part of a vehicle, and the plurality of digital keys are used to operate the vehicle.

A method for digital key monitoring through user profiling is provided herein. The method comprises receiving a plurality of key sharing requests at an electronic circuit configured to store a plurality of digital keys and generate a plurality of features in the electronic circuit in response to the plurality of key sharing requests. The method includes generating an alert signal in a first server computer in response to finding one or more anomalies in the plurality of features to initiate a notification to a primary user device associated with the electronic circuit. The method also includes sending a suspend notification signal from the first server computer to the electronic circuit in response to the finding of the one or more anomalies in the plurality of features. The method further includes suspending use of the plurality of digital keys at the electronic circuit in response to reception of the suspend notification signal.

In one or more embodiments of the method, the electronic circuit receives the plurality of key sharing requests from a plurality of secondary user devices. At least one of the plurality of secondary user devices comprises a smart device that is portable.

In one or more embodiments of the method, generating the plurality of features comprises analyzing a plurality of physical distances between the electronic circuit and the plurality of secondary user devices, and analyzing a plurality of arrival times of the plurality of key sharing requests.

One or more embodiments of the method further comprises determining a plurality of clusters of the plurality of features using the first server computer, and tracking the plurality of clusters in a multidimensional space to find the one or more anomalies using the first server computer.

One or more embodiments of the method further comprises generating individual validation decisions for individual clusters of the plurality of clusters based on the tracking using the first server computer. The individual validation decisions indicates that the individual clusters of the plurality of clusters are either a normal behavior or a misbehavior, and the generation of the alert signal is in response to at least one of the individual validation decisions indicating the misbehavior.

One or more embodiments of the method further comprises estimating a plurality of classifications of the plurality of clusters in a multidimensional space using the first server computer to find the one or more anomalies.

One or more embodiments of the method further comprises comparing the plurality of classifications with a plurality of use case classes using the first server computer.

The generation of the alert signal is in response to at least one mismatch between the plurality of classifications and the plurality of use case classes.

A digital key sharing system is provided herein. The digital key sharing system comprises a vehicle, a first server computer, a second server computer and a primary user device. The vehicle has an electronic circuit configured to store a plurality of digital keys used to operate the vehicle, receive a plurality of key sharing requests for the vehicle, and generate a plurality of features in response to the plurality of key sharing requests. The first server computer is in wireless communication with the electronic circuit. The first server computer is configured to generate an alert signal in response to finding one or more anomalies in the plurality of features. The second server computer is in communication with the first server computer and in wireless communication with the electronic circuit. The second server computer is configured to send a device notification signal in response to the alert signal, and configured to send a suspend notification signal to the electronic circuit in response to the alert signal. The electronic circuit is further configured to suspend use of the plurality of digital keys in response to reception of the suspend notification signal. The primary user device is in wireless communication with the electronic circuit and the second server computer. The primary user device is configured to present a message to a user of the primary user device in response to the device notification signal, receive an input signal from the user in response to the message, and transfer an output signal to the electronic circuit in the vehicle in response to the input signal to resume or terminate use of the plurality of digital keys.

One or more embodiments of the digital key sharing system comprises a plurality of secondary user devices configured to generate the plurality of key sharing requests. At least one of the plurality of secondary user devices comprises a smart device that is portable.

In one or more embodiments of the digital key sharing system, the electronic circuit is further configured to generate the plurality of features by analyzing a plurality of physical distances between the electronic circuit and the plurality of secondary user devices, and analyze a plurality of arrival times of the plurality of key sharing requests.

In one or more embodiments of the digital key sharing system, the first server computer is further configured to determine a plurality of clusters of the plurality of features, and track the plurality of clusters in a multidimensional space to find the one or more anomalies.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure generally describe a technique to detect misbehavior and Sybil attacks in digital key creation and sharing through recognizing key aspects of system and/or user behavior. Inconsistencies in spatial and/or temporal distribution of generated digital keys may invoke an alert notification from a vehicle back-end system. The technique generally establishes a detection system built around digital key system that enhances attack detection. A Sybil attack generally involves a generation of many improper (or invalid) digital key sharing requests that prevent an electronic circuit, that utilizes the digital keys, from distinguishing between valid requests and invalid requests.

A definition of features that constitute a behavioral pattern of the issued digital keys may be established on a per user basis. The technique generally derives and profiles user patterns through statistical analysis. The statistical analysis may establish a spatial-temporal association of digital keys with the users. A customer-facing alert system may be used to notify a primary user of potential misbehavior events. The primary user may verify the events to either resume use of the digital keys or terminate the digital keys to prevent unauthorized access to the vehicle.

Figure 1:
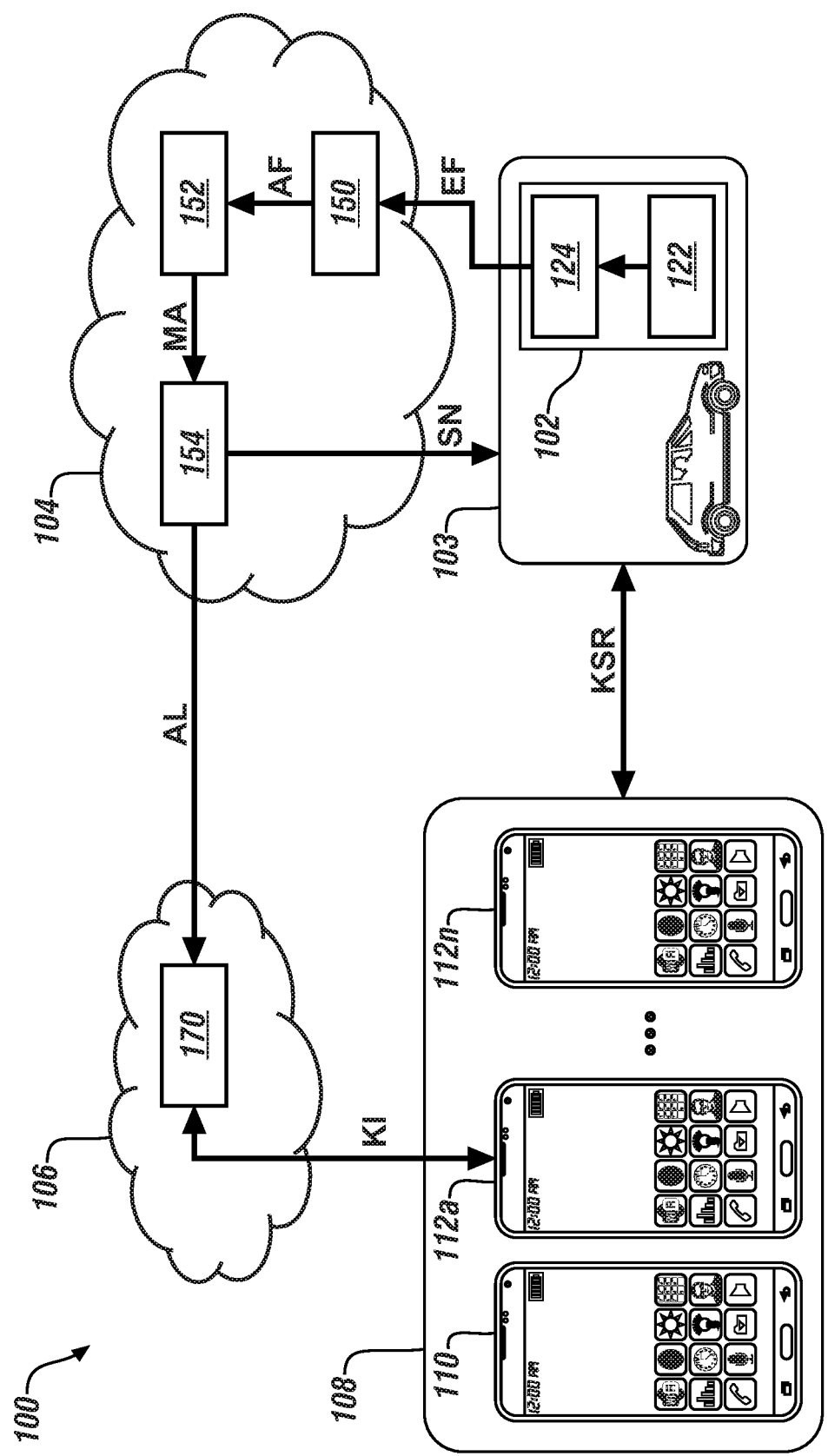
FIG. 1 is a schematic diagram of a digital key sharing system in accordance with an exemplary embodiment.

Referring to FIG. 1, a schematic diagram of an example implementation of a digital key sharing system 100 is shown in accordance with an exemplary embodiment. The digital key sharing system 100 generally comprises an electronic circuit 102, a first server computer 104, a second server computer 106 and multiple smart devices 108. The electronic circuit 102 may reside within a vehicle 103. The smart devices 108 generally include a primary user device 110 and multiple secondary user devices 112a-112n. The electronic circuit 102 generally implements a shared key tracking operation 122 and a feature extraction operation 124. The first server computer 104 generally implements a feature analysis operation 150, a misbehavior analysis operation 152 and a response system operation 154. The second server computer 106 may include a notification operation 170. The various operations may be implemented solely in hardware or a combination of software executing on hardware.

A key invocation signal (e.g., KI) may be exchanged between the smart devices 108 and the second server computer 106. The key invocation signal KI generally conveys data used to verify and install digital keys in the smart devices 108. A key sharing request signal (e.g., KSR) may be exchanged between the smart devices 108 and the electronic circuit 102. The key sharing request signal KSR may transfer data used to request and authorized use of the digital keys by the smart devices 108. An extracted feature signal (e.g., EF) may be generated by the electronic circuit 102 and transmitted to the first server computer 104. The extracted feature signal EF generally carries features gathered by the electronic circuit 102 from multiple shared key requests.

An analyzed feature signal (e.g., AF) may be generated by the feature analysis operation 150 and presented to the misbehavior analysis operation 152. The analyzed feature signal AF may carry parameters derived from the features received in the extracted feature signal EF. A message alert signal (e.g., MA) may be generated by the misbehavior analysis operation 152 and transferred to the response system alert operation 154. The message alert signal MA may be asserted when a misuse of the digital keys has been detected. Otherwise, the message alert signal MA may be deasserted. An alert signal (e.g., AL) may be transferred from the first server computer 104 to the second server computer 106. The alert signal AL may indicate a notification of a misbehavior event. A suspend notification signal (e.g., SN) may be generated by the first server computer 104 and transmitted to the electronic circuit 102. The suspend notification signal SN may notify the electronic circuit 102 that a misbehavior event has been detected.

The electronic circuit 102 may be implemented as an electronic control unit in the vehicle 103. The electronic circuit 102 is generally operational to perform tracking of the shared key requests and perform a feature extraction and analysis of the shared key requests received by the vehicle 103. The features extracted by the analysis may be transmitted in the signal EF to the first server computer 104.

The electronic circuit 102 is in wireless communication with the smart devices 108. In various embodiments, the wireless communication with the smart devices 108 may have a limited range. For example, the wireless communication between the smart devices 108 and the electronic circuit 102 may be implemented with Bluetooth and/or near field communications. The electronic circuit 102 may also be in wireless communication with the first server computer 104. The wireless communication with the first server computer 104 may cover long distances. In various embodiments, the wireless communication with the first server computer 104 may be implemented with cellular communication and/or Wi-Fi communication connected to one or more backbone networks.

For the tracking of the shared key requests, the shared key tracking operation 122 may determine if individual key sharing requests are signed by a valid certificate by the primary user device 110. If valid, the tracking feature may record (or store) relevant digital key sharing information of the key sharing requests an internal secure memory. In the event that the electronic circuit 102 receives a suspend notification from the first server computer 104, the shared key tracking operation 122 may temporarily suspend the use of the digital keys until further authorization is received from the primary user device 110.

The feature extraction operation 124 may perform the feature extraction and analysis operations. The feature extraction operation 124 may perform a discrete wavelet analysis (DWT) on the key sharing request information to determine a change point detection. The discrete wavelet analysis is generally provided by formulae 1 as follows:

$$f(t)=\Sigma_k u_{j_o,k} \cdot \varphi_{j_o,k}(t)+\Sigma_{j=j_0}^{\infty}\Sigma_k w_{j,k} \cdot \psi_{j,k}(t) \; u_{j,k}=W_\Phi(f(j,k)), \; w_{j,k}=W_\psi(f(j,k)) \quad (1)$$

Where $u_{j,k}$ and $w_{j,k}$ are an approximation coefficient and a detailed coefficient, $\psi_{j,k}(t)$ is a mother wavelet, $\varphi_{j,k}(t)$ is a scaling function, $f(j,k)$ is the signal of interest, $W_\Phi(f(j,k))$ is a scaling function wavelet transform of the original signal, and $W_\psi(f(j,k))$ is the mother-wavelet wavelet transform.

Sudden changes in discrete signals (e.g., indications of high volumes of requests) may be depicted by higher values of the coefficients for a signal period. Additional user profiling features that may be extracted include, frequencies of derived secondary keys, durations of derived secondary keys, numbers of delegation requests (from secondary user devices) and geolocation mismatches (e.g., key sharing requests originating from long distances away from the vehicle 103). Other forms of feature extraction and analysis operations may be implemented to meet the design criteria of a particular application.

The vehicle 103 may be implemented as an automobile (or car). In various embodiments, the vehicle 103 may include, but is not limited to, a passenger vehicle, a truck, an autonomous vehicle, a gas-powered vehicle, an electric-powered vehicle, a hybrid vehicle, a motorcycle, a boat, a train and/or an aircraft. In some embodiments, the vehicle 103 may include stationary objects such as power back-up systems (e.g., uninterruptible power supplies) and/or stand-alone generators. Other types of vehicles 103 may be implemented to meet the design criteria of a particular application.

The first server computer 104 may be implement as a cloud server computer for an original equipment manufacturer of the vehicle 103. The first server computer 104 may be in wireless communication with the electronic circuit 102. The first server computer 104 may also be in electronic communication with the second server computer. The electronics communication between the first server computer 104 and the second server computer 106 may be implemented as wired communication, wireless communication or a combination of wireless and wired communication.

The first server computer 104 may perform feature analysis in the feature analysis operation 150, misbehavior analysis in the misbehavior analysis operation 152 and generate response system alerts using the response system alert operation 154 based on the features received in the extracted feature signal EF. Upon detection of misbehavior, the response system alert operation 154 may send an alert notification in the alert signal AL to the second server computer 106 and a suspend notification in the suspend notification signal SN to the electronic circuit 102. The alert signal AL may initiate a notification to the primary user device 110 associated with the electronic circuit 102/vehicle 103 (e.g., the vehicle owner). The suspend notification signal SN generally commands the electronic circuit 102 to suspend use of the digital keys. In various embodiments, the shared key tracking operation 122 and/or the feature extraction operation 124 may be implemented in the first server computer 104. In such embodiments, the electronic circuit 102 may retain relevant information for the vehicle 103.

The second server computer 106 may be implemented as another cloud server computer for a wireless service provider of the smart devices 108. The second server computer 106 may be in the electronic communication with the first server computer 104. The second server computer 106 may also be in wireless communication with the smart devices 108. The wireless communication is generally implemented by cellular communication and/or or Wi-Fi communication connected to one or more backbone networks. The second server computer 106 is generally operational to notify the primary user device 110 when a misbehavior event has been detected by the first server computer 104. Upon reception of an alert notification in the alert signal AL, the notification operation 170 may determine the primary user device 110 associated with the vehicle 103 experiencing the misbehavior (e.g., inconsistent key sharing requests and/or Sybil attacks) and notify the primary user device 110. Since the first server computer 104 has already instructed the electronic circuit 102 to suspend use of the digital keys, the primary user device 110 may subsequently either authorize the electronic circuit 102 to resume allowance of the digital keys or terminate use of the digital keys stored within the secure memory.

The smart devices 108 may be implemented as wireless digital communication devices. In various embodiments, the smart devices 108 may include, but are not limited to, cellular telephones, smart watches, personal digital assistances, netbooks, notepads, laptop computers, desktop computers and the like. Other types of smart devices 108 may be implemented to meet the design criteria of a particular application.

Figure 2:
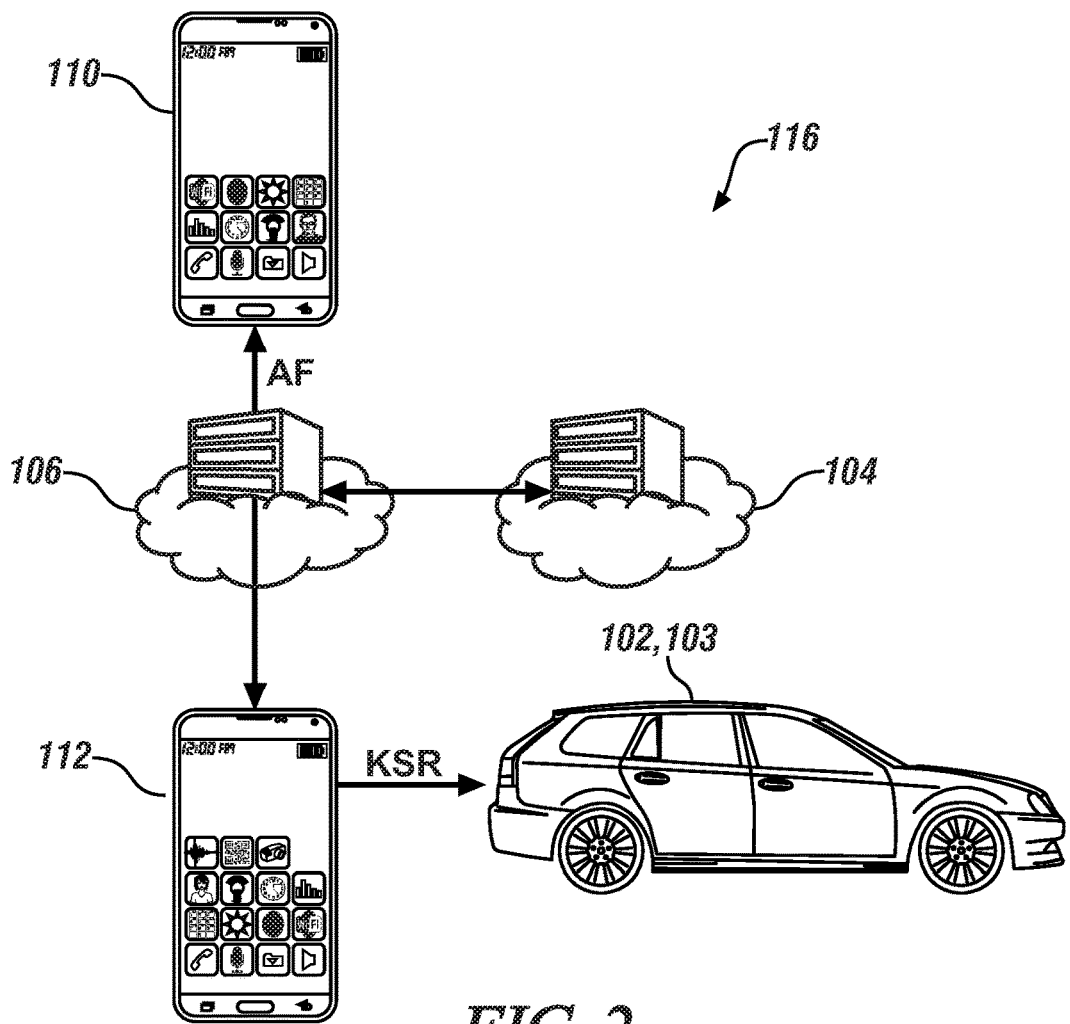
FIG. 2 is a schematic diagram of an authentication method in accordance with an exemplary embodiment.

Referring to FIG. 2, a schematic diagram of an example implementation of an authentication method 116 is shown in accordance with an exemplary embodiment. The authentication method (or process) 116 may be implemented by the primary user device 110, the first server computer 104, the second server computer 106, a secondary user device 112 and the electronic circuit 102 in the vehicle 103. The secondary user device 112 may be representative of the secondary user devices 112a-112n. An authentication flow signal (e.g., AF) may be exchanged between the primary user device 110 and the secondary user device 112. The authentication flow signal AF may convey device certificates, public keys secondary keys and digital keys.

The authentication method 116 may be initiated by the primary user device 110 transmitting a signed car sharing invite to the secondary user device 112 via the authentication flow signal AF. The car sharing invite may be relayed from the primary user device 110 to the secondary user device 112 through the first server computer 104 and the second server computer 106 The second server computer 106 generally provides wireless communication between the primary user device 110 and the secondary user device 112 during the authentication. The first server computer 104 may be operational to facilitate and monitor the authentication. In various embodiments, the first server computer 104 may track which secondary user devices 112 are receiving and/or accepting the signed car sharing invites. An individual car sharing invite may include a primary device certificate and a primary device public key.

The secondary user device 112 may respond to the car sharing invite by accepting or denying the invite. If the invite is rejected, the secondary user device 112 may ignore the car sharing invite. If the invite is accepted, the secondary user device 112 may verify the primary device certificate. If the primary device certificate is valid, the secondary user device 112 may store the primary device public key in a secure storage and transmit a signed car sharing request back to the primary user device 110 in the authentication flow signal AF. The car sharing request may include a secondary device certificate and a secondary device public key.

The primary user device 110 may verify the secondary device certificate. If the secondary device certificate is invalid, the primary user device 110 may reject the request and stop the authentication method 116. If the secondary device certificate is valid, the primary user device 110 may store the secondary device public key in a secure storage. A secondary user digital key and a primary device secondary key may be generated in the primary user device 110 and transferred to the secondary user device 112.

Upon reception of the secondary user digital key and the primary device secondary key, the secondary user device 112 may create an authorized signature. The authorized signature may be based on the secondary user digital key and the primary device secondary key. The secondary user device 112 may subsequently transmit the secondary user digital key and the signature to the electronic circuit 102 to attempt accessing the vehicle 103. The electronic circuit 102 may verify the signature received from the secondary user device 112. If the signature is invalid, the electronic circuit 102 may reject the request to access the vehicle 103. If the signature is valid, the electronic circuit 102 may store the secondary user digital key in a secured memory.

Figure 3:
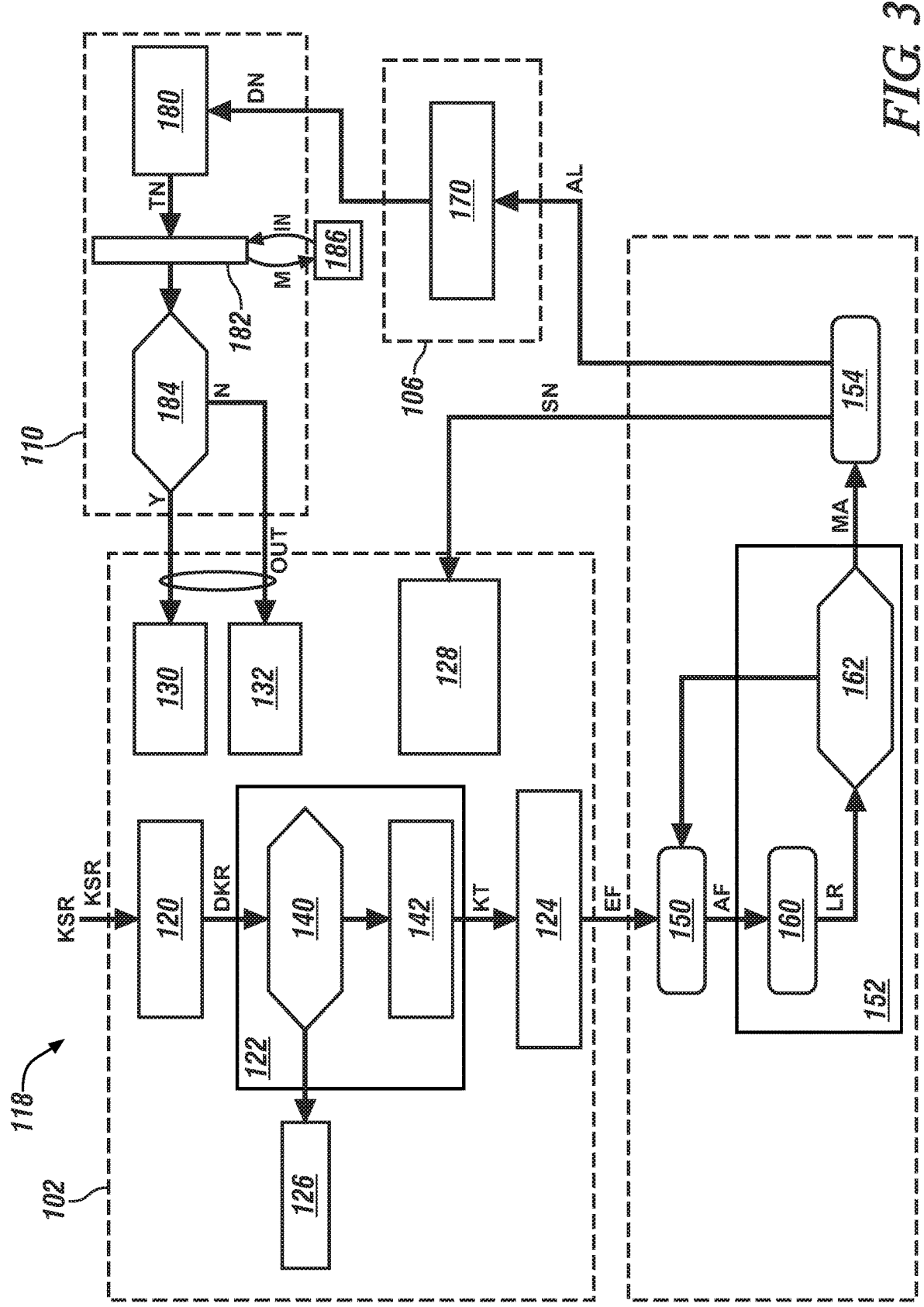
FIG. 3 is a flow diagram of a threat detection method in accordance with an exemplary embodiment.

Referring to FIG. 3, a flow diagram of an example implementation of a threat detection method 118 is shown in accordance with an exemplary embodiment. The threat detection method (or process) 118 may be implemented by the digital key sharing system 100.

The electronic circuit 102 may implement a receive operation (or step) 120, the shared key tracking operation (or step) 122, the feature extraction operation (or step) 124, a reject operation (or step) 126, a suspend operation (or step) 128, a resume operation (or step) 130 and a terminate operation (or step). The shared key tracking operation 122 may comprises a validity decision operation (or step) 140 and a store operation (or step) 142.

A digital key received signal (e.g., DKR) may be generated by the received operation 120 and presented to the shared key tracking operation 122. A key tracking signal (e.g., KT) may be generated by the shared key tracking operation 122 and presented to the feature extraction operation 124. The feature extraction operation 124 may present the extracted feature signal EF.

The first server computer 104 may implement the feature analysis operation (or step) 150, the misbehavior analysis operation (or step) 152 and the response system alert operation (or step) 154. The misbehavior analysis operation 152 may include an unsupervised learning engine operation (or step) 160 and an anomaly decision operation (or step) 162.

The analyzed feature signal AF may be generated by the feature analysis operation 150 and presented to the misbehavior analysis operation 152. A learning results signal (e.g., LR) may be generated by the unsupervised learning engine operation 160 and transferred to the anomaly decision operation 162. The anomaly decision operation 162 may present the message alert signal MA to the response system alert operation 154. The alert signal AL and the suspend notification signal SN may be presented by the response system alert operation 154.

The second server computer 106 may implement the notification operation (or step) 170. A disable notification signal (e.g., DN) may be generated by the second server computer 106 and transmitted to the primary user device 110. The disable notification signal DN may convey information to the primary user device 110 indicating that the digital keys of the vehicle 103 associated with the primary user device 110 have been temporarily suspended.

The primary user device 110 may implement a temporary notification operation (or step) 180, a user interface operation (or step) 182 and a user decision operation (or step) 184. The primary user device 110 may be controlled by a user 186.

The user interface operation 182 may present a message signal (e.g., M) to the user 186. The message signal M may convey a message that informs the user 186 that a misbehavior event has been detected. An input signal (e.g., IN) may be received by the user interface operation 182 from the user 186. The input signal IN may convey a selection by the user 186 to resume use of the digital keys or terminate use of the digital keys. An output signal (e.g., OUT) may be generated by the primary user device 110 and transmitted to the electronic circuit 102. The output signal OUT may include a first component (e.g., Y) that commands the electronic circuit 102 to resume use of the digital keys. The output signal OUT may include a second component (e.g., N) that commands the electronic circuit 102 to terminate use of the digital keys.

In the receive operation 120, the electronic circuit 102 in the vehicle 103 may receive a new car sharing request in the key sharing request signal KSR. The shared key tracking operation 122 may examine the secondary user digital key and signature provided in the new car sharing request. In the validity decision operation 140, electronic circuit 102 may determine if the request was signed by a valid primary device certificate. If the certificate is not valid, the electronic circuit 102 may reject the request in the reject operation 126. If the certificate is valid, the store operation 142 may be used to store the secondary user digital key in a secure memory within the electronic circuit 102.

Post processing of the stored digital key information and feature extraction may be performed by the feature extraction operation 124. Features extracted from the requests may include spatial information and/or temporal information. The spatial information may include, but is not limited to, where the vehicle 103 is located and where the request is coming from. For example, in car sharing scenarios, the request may originate from a long distance away from the vehicle 103 (e.g., greater than 1,000 yards to miles away). In family sharing scenarios, the request may originate in close proximity to the vehicle 103 (e.g., within 100 yards or closer). The temporal features may include, but are not limited to, the times at which a current request is received, and the time elapsed since a previous request. The features may be transmitted to the first server computer 104 via the extracted feature signal EF.

Upon reception of the extracted features in the first server computer 104, the feature analysis operation 150 may be performed to determine where the features fall in a clustering space. The analyzed features may be examined by the misbehavior analysis operation 152 to determine if misuse of the digital keys is taking place. In the unsupervised learning engine operation 160, locations of the features within the clustering space may be examined. Results of the examination may be presented in the learning results signal LR to the anomaly decision operation 162.

If no anomaly is detected, the anomaly decision operation 162 returns to the feature analysis operation 150 and waits to receive a new set of features from the electronic circuit 102. If an anomaly is detected, the anomaly decision operation 162 asserts the message alert signal MA and includes an identification of the vehicle 103 having the digital key issues.

When the message alert signal MA is asserted, the response system alert operation 154 may generate and transmit the alert signal AL to the second server computer 106. The alert signal AL may contain the identification of the vehicle 103. The response alert operation 154 may also generate and transmit the suspend notification signal SN to the electronic circuit 102 of the vehicle 103 experiencing the misuse of the digital keys.

Upon reception of the alert signal AL, the notification operation 170 in the second server computer 106 may determine which particular primary user device 110 is associated with the vehicle 103 identified in the alert signal AL. The notification operation 170 may subsequently send the disable notification signal DN to the primary user device 110.

The temporary notification operation 180 in the primary user device 110 may respond to the disable notification signal DN by sending a temporary notification signal (e.g., TN) to the user interface operation 182. The user interface operation 182 may generate and present a visual, an audio and/or a haptic message in the message signal M to the user 186. The message generally informs (or notifies) the user 186 that the digital keys of the vehicle 103 have been suspended. The user 186 may reply to the message by entering an input command to the primary user device 110. The input command may be sensed as the input signal IN. The user decision operation 184 may receive the input command from the user interface operation 182. If the input command allows use of the digital keys to continue, the user decision operation 184 may assert the component Y and deassert the component N in the output signal OUT. If the input command ends future use of the digital keys in the vehicle 103, the user decision operation 184 may deassert the component Y and assert the component N in the output signal.

Figure 4:
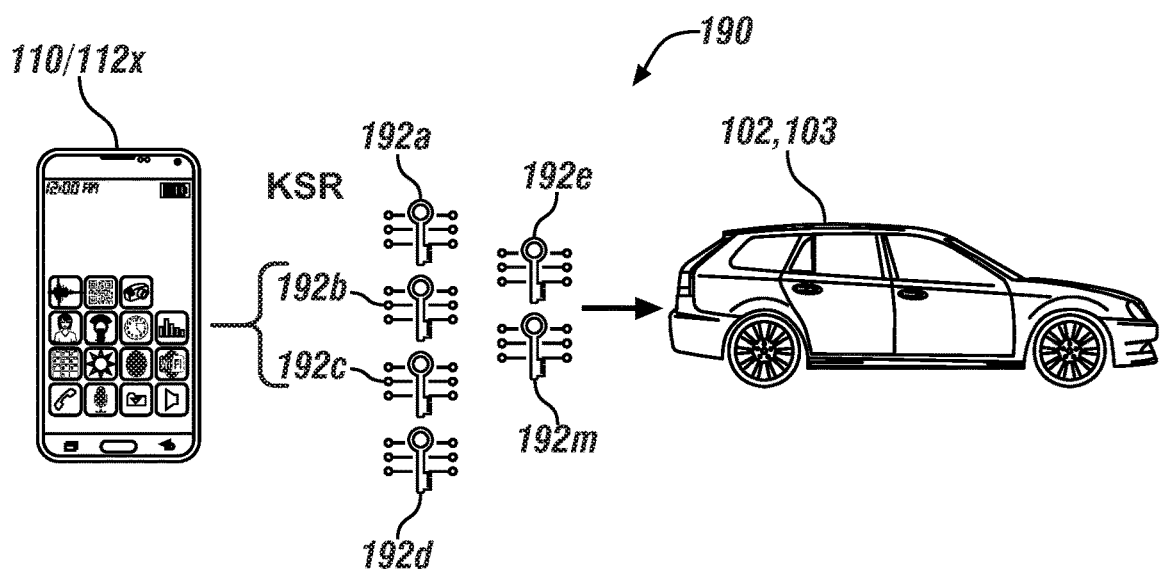
FIG. 4 is a schematic diagram of a threat model in accordance with an exemplary embodiment.

The electronic circuit 102 may respond to the output signal OUT based on the conditions of the components Y and N. If the component Y is asserted and the component N is deasserted, the resume operation 130 may allow use of the digital keys to resume and allow new digital key requests to be processed. If the component Y is deasserted and the component N is asserted, the terminate operation 132 may terminate use of the digital keys stored within the electronics circuit 102. After termination, use of the digital keys within the electronic circuit 102 may resume when the first server computer 104 and/or another backend server computer, performs an extra authentication. In various embodiments, the blocking or blacklisting of the digital keys may be removed after a specified amount of time Referring to FIG. 4, a schematic diagram of an example implementation of a threat model 190 is shown in accordance with an exemplary embodiment. The threat model 190 may cover multiple examples where one of the smart devices 108 is compromised. Threats generally occur when the primary user device 110 and/or one or more of the secondary user devices 112a-112n (represented as 112x) generates multiple key sharing invites 192a-192n for the electronic circuit 102/vehicle 103.

In a first scenario, the primary user device 110 may be compromised. The compromised primary user device 110 may transmit multiple valid certificates to unauthorized secondary user devices 112a-112n. The unauthorized secondary user devices 112a-112n may initiate a large number of unwanted (or invalid) key sharing invites 192a-192n. The multiple key sharing invites 192a-192n from the unauthorized secondary user devices 112a-112n may form a first type of Sybil attack. During the first type of Sybil attack, the creation of a plethora of unwanted (or improper) key sharing invites 192a-192n may affect use of the vehicle 103 unless the digital key sharing system 100 can distinguish intended (authorized) key sharing requests from the unwanted key sharing invites 192a-192n.

In a second scenario, one or more of the secondary user devices 112a-112n may become compromised. A compromised secondary user device (e.g., 112x) may contain valid certificates that may be used to initiate the large number of digital key sharing requests 192a-192n. The multiple key sharing invites 192a-192n from a compromised secondary user device 112x may form a second type of Sybil attack. During the second type of Sybil attack, the compromised secondary user device 112x may send the unwanted (or improper) digital key sharing requests 192a-192n that affect use of the vehicle 103.

Figure 5:
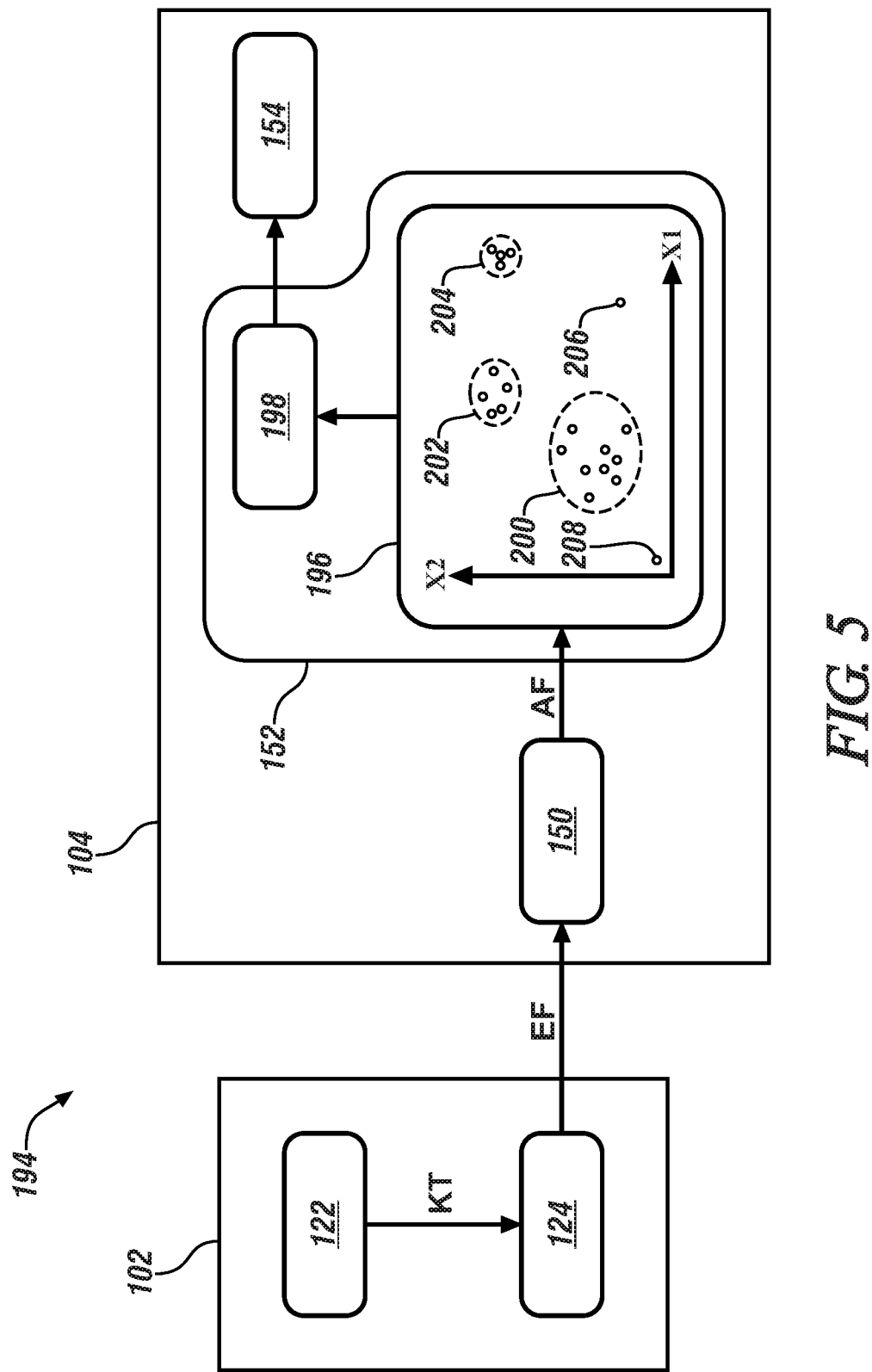
FIG. 5 is a schematic diagram of a clustering-based misbehavior intrusion detection method in accordance with an exemplary embodiment.

Referring to FIG. 5, a schematic diagram of an example implementation of a clustering-based misbehavior intrusion detection method 194 is shown in accordance with an exemplary embodiment. The clustering-based misbehavior intrusion detection method (or process) 194 may be implemented by the electronic circuit 102 and the first server computer 104. The electronic circuit 102 may perform the key tracking operation 122 and the feature extraction operation 124 on the digital key sharing requests. The digital key sharing requests from each individual user of the smart devices 108 generally provide multidimensional data samples. In various embodiments, the dimensions may include at least a spatial dimension and a temporal dimension. The features may be extracted by the electronic circuit 102 and presented to the first server computer 104 via the extracted feature signal EF.

The first server computer 104 may include the feature analysis operation 150, the misbehavior analysis operation 152 and the response system alert operation 154. The misbehavior analysis operation 152 generally comprises a clustering operation 196 and a cluster tracking and validation operation 198.

In the clustering operation 196, various clustering methods and/or distance functions may be used to establish clusters (e.g., 200, 202, 204, 206 and 208) of the digital key sharing requests. The distance functions may include a Euclidean distance, a Mahalanobis distance and/or the like. The cluster tracking and validation operation 198 may keep track of the clusters 200-208 and validate newly created clusters (e.g., 204) to monitor a potential large scale intrusion. Some clusters (e.g., 206 and 208) with a few data points gathered by the cluster operation 196 may be considered outlier clusters and so ignored. Highly dense clusters, such as clusters 200 and 202 may indicate misbehavior. Furthermore, clusters that form over a short period of time may also indicate misbehavior. Once the cluster tracking and validation operation 198 determines that a cluster (e.g., 200, 202 or 204) of key sharing requests may be due to misbehavior and/or an attack, the cluster tracking and validation operation 198 may assert the message alert signal MA and transfer the alert to the response system alert operation 154.

Figure 6:
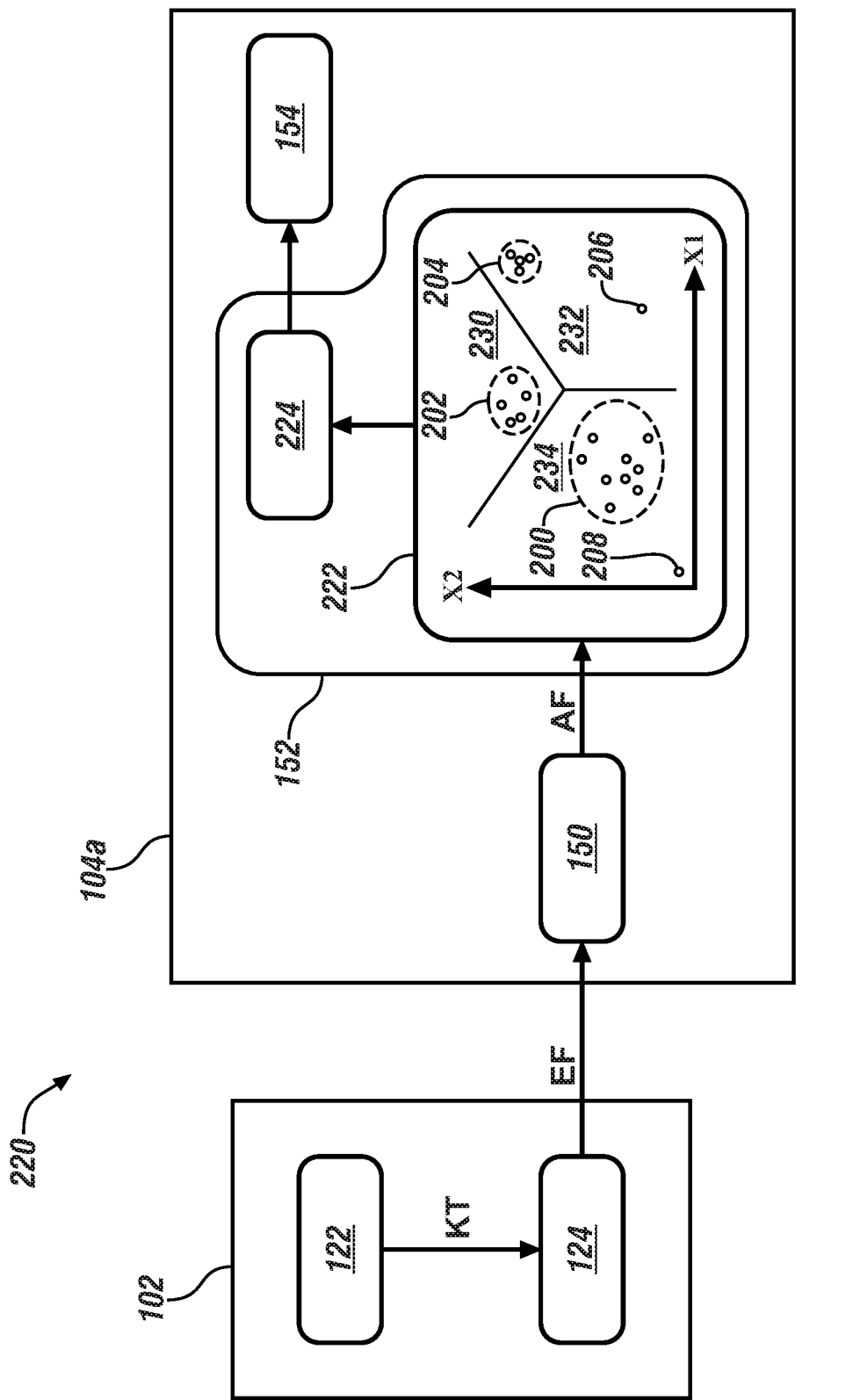
FIG. 6 is a schematic diagram of a learning-based misbehavior intrusion detection method in accordance with an exemplary embodiment.

Referring to FIG. 6, a schematic diagram of an example implementation of a learning-based misbehavior intrusion detection method 220 is shown in accordance with an exemplary embodiment. The learning-based misbehavior intrusion detection method (or process) 220 may be implemented by the electronic circuit 102 and a first server computer 104a. The first server computer 104a may be a variation of the first server computer 104.

The electronic circuit 102 may perform the key tracking operation 122 and the feature extraction operation 124 of the digital key sharing requests. The digital key sharing requests from each individual user of the smart devices 108 generally provide multidimensional data samples. In various embodiments, the dimensions may include at least a spatial dimension and a temporal dimension. The features may be extracted by the electronic circuit 102 and presented to the first server computer 104a via the extracted feature signal EF.

The first server computer 104a may include the feature analysis operation 150, the misbehavior analysis operation 152 and the response system alert operation 154. The misbehavior analysis operation 152 generally comprises a classification operation 222 and an estimated classifier operation 224.

In the classification operation 222, various classification methods may be used to establish multiple classes (e.g., 230, 232 and 234) for the clusters 200, 202, 204, 206 and 208 of the key sharing requests. By way of example the class 230 may form a friends and family class where the key sharing is performed among friends and/or family of the user of the primary user device 110. The class 232 may form a peer-to-peer (P2P) class where the key sharing is performed from peer-to-peer among the smart devices 108. The class 234 may form a business-to-peer (B2P) class where the primary user device 110 belongs to a business, such as a car rental company, and the secondary user devices 112a-112n belong to people who rent the cars.

The estimated classifier operation 224 may be implemented as using existing classifiers with normal data (e.g., support vector machines (SVM), neural networks, etc.). When the estimated classifier operation 224 determines that a cluster 200-208 of key sharing requests within one of the classifications 230-234 may be due to misbehavior and/or an attack, the estimated classifier operation 224 may assert the message alert signal MA to the response system alert operation 154. For example, if the vehicle 103 is designated solely for family-and-friends type of digital key sharing (e.g., classification 230), a cluster in the peer-to-peer classification 232 and/or the business-to-peer classification 234 may trigger an alert in the message alert signal MA.

Embodiments of the digital key sharing system 100 generally provide anomaly detection for user misbehavior and/or compromises in the realms of digital key sharing ecosystems. The digital key sharing system 100 may implement wavelet analysis to detect anomalies. A clustering-based misbehavior intrusion detection method 194 and/or a learning-based misbehavior intrusion detection method 220 may be implemented to determine when misbehavior and/or Sybil attacks occur. Furthermore, the digital key sharing system 100 may be integrated with current vehicle architectures.

While the best modes for carrying out the disclosure have been described in detail, those familiar with the art to which this disclosure relates will recognize various alternative designs and embodiments for practicing the disclosure within the scope of the appended claims.

What is claimed is:

1. A digital key sharing system comprising:
   an electronic circuit configured to store a plurality of digital keys, receive a plurality of key sharing requests, and generate a plurality of features by extracting from the plurality of key sharing requests one or more of spatial information, temporal information, or both about the plurality of key sharing requests, and transmit the plurality of features out of the electronic circuit; and
   a first server computer in wireless communication with the electronic circuit, wherein the first server computer is configured to receive the plurality of features transmitted from the electronic circuit, analyze the plurality of features in search of a plurality of anomalies in the plurality of features that indicate an attack, generate an alert signal in response to finding one or more of the plurality of anomalies in the plurality of features to initiate a notification to a primary user device associated with the electronic circuit, and send a suspend notification signal to the electronic circuit in response to the finding of the one or more anomalies in the plurality of features, wherein the electronic circuit is further configured to suspend use of the plurality of digital keys in response to reception of the suspend notification signal.

2. The digital key sharing system according to claim 1, wherein the electronic circuit receives the plurality of key sharing requests from a plurality of secondary user devices, and at least one of the plurality of secondary user devices comprises a smart device that is portable.

3. The digital key sharing system according to claim 2, wherein the electronic circuit is further configured to generate the plurality of features by analyzing a plurality of physical distances between the electronic circuit and the plurality of secondary user devices, and analyze a plurality of arrival times of the plurality of key sharing requests.

4. The digital key sharing system according to claim 1, wherein the first server computer is further configured to determine a plurality of clusters of the plurality of features, and track the plurality of clusters in a multidimensional space to find the one or more anomalies that indicate a Sybil attack.

5. The digital key sharing system according to claim 4, wherein the first server computer is further configured to generate individual validation decisions for individual clusters of the plurality of clusters based on the tracking, the individual validation decisions indicate that the individual clusters of the plurality of clusters are either a normal behavior or a misbehavior, and the generation of the alert signal is in response to at least one of the individual validation decisions indicating the misbehavior.

6. The digital key sharing system according to claim 5, wherein the misbehavior comprises the Sybil attack during which the electronic circuit receives a plurality of improper digital key sharing requests.

7. The digital key sharing system according to claim 4, wherein the first server computer is further configured to estimate a plurality of classifications of the plurality of clusters in the multidimensional space to find the one or more anomalies that indicate the Sybil attack.

8. The digital key sharing system according to claim 7, wherein the first server computer is further configured to compare the plurality of classifications with a plurality of use case classes, and the generation of the alert signal is in response to at least one mismatch between the plurality of classifications and the plurality of use case classes.

9. The digital key sharing system according to claim 1, wherein the electronic circuit forms part of a vehicle, and the plurality of digital keys are used to operate the vehicle.

10. A method for digital key monitoring through user profiling, comprising:
   receiving a plurality of key sharing requests at an electronic circuit configured to store a plurality of digital keys;
   generating a plurality of features in the electronic circuit by extracting from the plurality of key sharing requests one or more of spatial information, temporal information, or both about the plurality of key sharing requests;
   transferring the plurality of features wirelessly from the electronic circuit to a first server computer;
   analyzing the plurality of features in the first server computer in search of a plurality of anomalies in the plurality of features that indicate an attack;
   generating an alert signal in the first server computer in response to finding one or more of the plurality of anomalies in the plurality of features to initiate a notification to a primary user device associated with the electronic circuit;
   sending a suspend notification signal from the first server computer to the electronic circuit in response to the finding of the one or more anomalies in the plurality of features; and
   suspending use of the plurality of digital keys at the electronic circuit in response to reception of the suspend notification signal.

11. The method according to claim 10, wherein the electronic circuit receives the plurality of key sharing requests from a plurality of secondary user devices, and at least one of the plurality of secondary user devices comprises a smart device that is portable.

12. The method according to claim 11, wherein generating the plurality of features comprises:
   analyzing a plurality of physical distances between the electronic circuit and the plurality of secondary user devices; and
   analyzing a plurality of arrival times of the plurality of key sharing requests.

13. The method according to claim 10, further comprising:
   determining a plurality of clusters of the plurality of features using the first server computer; and
   tracking the plurality of clusters in a multidimensional space to find the one or more anomalies that indicate a Sybil attack using the first server computer.

14. The method according to claim 13, further comprising:
   generating individual validation decisions for individual clusters of the plurality of clusters based on the tracking using the first server computer, wherein the individual validation decisions indicate that the individual clusters of the plurality of clusters are either a normal behavior or a misbehavior, and the generation of the alert signal is in response to at least one of the individual validation decisions indicating the misbehavior.

15. The method according to claim 13, further comprising:
   estimating a plurality of classifications of the plurality of clusters in the multidimensional space using the first server computer to find the one or more anomalies that indicate the Sybil attack.

16. The method according to claim 15, further comprising:
   comparing the plurality of classifications with a plurality of use case classes using the first server computer, wherein the generation of the alert signal is in response to at least one mismatch between the plurality of classifications and the plurality of use case classes.

17. A digital key sharing system comprising:
   a vehicle having an electronic circuit configured to store a plurality of digital keys used to operate the vehicle, receive a plurality of key sharing requests for the vehicle, generate a plurality of features by extracting from the plurality of key sharing requests one or more of spatial information, temporal information, or both about the plurality of key sharing requests, and transmit the plurality of key features out of the electronic circuit;
   a first server computer in wireless communication with the electronic circuit, wherein the first server computer is configured to receive the plurality of features transmitted from the electronic circuit, analyze the plurality of features in search of a plurality of anomalies in the plurality of features that indicate an attack, generate an alert signal in response to finding one or more of the plurality of anomalies in the plurality of features;
   a second server computer in communication with the first server computer and in wireless communication with the electronic circuit, wherein the second server computer is configured to send a device notification signal in response to the alert signal, and configured to send a suspend notification signal to the electronic circuit in response to the alert signal, and wherein the electronic circuit is further configured to suspend use of the plurality of digital keys in response to reception of the suspend notification signal; and
   a primary user device in wireless communication with the electronic circuit and the second server computer, wherein the primary user device is configured to present a message to a user of the primary user device in response to the device notification signal, receive an input signal from the user in response to the message, and transfer an output signal to the electronic circuit in the vehicle in response to the input signal to resume or terminate use of the plurality of digital keys.

18. The digital key sharing system according to claim 17, further comprising a plurality of secondary user devices configured to generate the plurality of key sharing requests, wherein at least one of the plurality of secondary user devices comprises a smart device that is portable.

19. The digital key sharing system according to claim 18, wherein the electronic circuit is further configured to generate the plurality of features by analyzing a plurality of physical distances between the electronic circuit and the plurality of secondary user devices, and analyze a plurality of arrival times of the plurality of key sharing requests.

20. The digital key sharing system according to claim 17, wherein the first server computer is further configured to determine a plurality of clusters of the plurality of features, and track the plurality of clusters in a multidimensional space to find the one or more anomalies that indicate a Sybil attack.

* * * * *